(No Model.)
B. R. TRULL.
MECHANICAL POWER.
No. 278,376. Patented May 29, 1883.
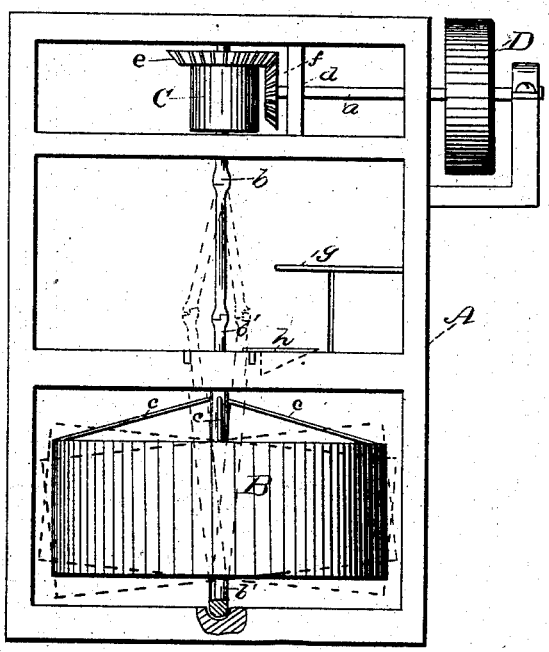
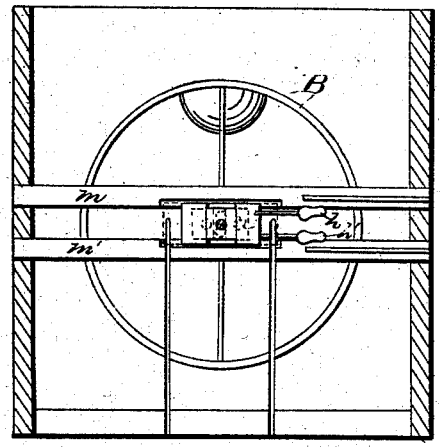
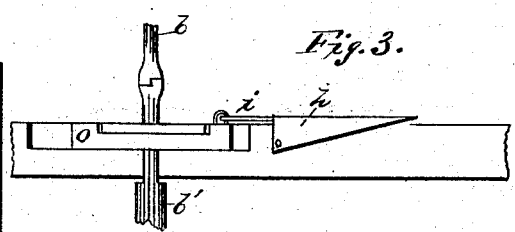
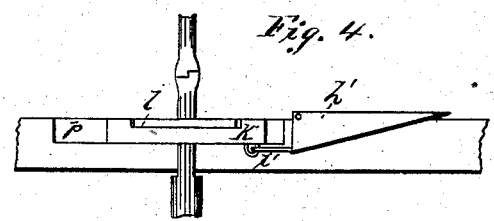
WITNESSES
Chas. R. Burr
W. E. Bowen
INVENTOR
Benjamin R Trull
Attorney

UNITED STATES PATENT OFFICE.

BENJAMIN R. TRULL, OF HOMINY CREEK, NORTH CAROLINA.

MECHANICAL POWER.

SPECIFICATION forming part of Letters Patent No. 278,376, dated May 29, 1883.

Application filed March 14, 1883. (No model.)

*To all whom it may concern:*

Be it known that I, BENJAMIN R. TRULL, a citizen of the United States, residing at Hominy Creek, in the county of Buncombe and State of North Carolina, have invented certain new and useful Improvements in Mechanical Powers, of which the following is a specification, reference being had therein to the accompanying drawings.

My invention relates to certain new and useful improvements in mechanical powers, for use in driving machinery, propelling vehicles, and any other place or places where power is needed.

The object of my invention is to construct a mechanical-power device that will yield a maximum amount of driving force with a minimum amount of friction and power requisite to operate the same. Another object is to construct a device that will impart power to machinery by economizing labor by the use of the treadle-connection in foot-power. I attain these objects by means of construction and arrangement of the various parts that will be more fully pointed out and described in the specification and claims.

Reference being had to the drawings forming a part of this application, Figure 1 is a perspective view of my invention, showing the shaft, gear-wheels, and drum in position. Fig. 2 is a longitudinal cross-section of the same, showing the slides, foot-treadles, and springs. Fig. 3 is a detail view, showing shaft, slide, foot-treadle, and connection. Fig. 4 is also a detail view, showing shaft, slide, and opposite foot-treadle.

Similar letters refer to similar parts throughout the drawings.

Referring to the drawings, A is a frame formed of uprights and cross-bars of suitable height to permit of the hanging and arrangement of the shafts and wheels, as hereinafter described. An upright shaft, $b'$, has a bearing in the center of the central cross-bar of frame A. A drum or wheel, B, is attached by arms to shaft $b$, and has inclined arms connecting the rim of said drum with said shaft. The upper part of shaft $b'$ passes through a sliding block, $n$, said block being provided with an elongated slot, $q$, and moving laterally in sliding block $k$. Sliding block $k$ is formed to receive the block $n$, and is provided with slots or grooves on which said block moves. Cross-bars $m$ and $m'$ are formed with recesses on their inner faces, near their centers, for the reception of sliding block $k$. Said sliding block $k$ is connected to foot-treadles $h$ and $h'$ by means of staples and connecting-rods $i$ and $i'$, that are pivoted to the inner faces of cross-bars $m$ and $m'$. A short distance above cross-bars $m$ and $m'$ shaft $b'$ is connected to shaft $b$ by means of a flexible joint, which is in turn connected in like manner to a shaft, $b^2$. Shaft $b^2$ extends upward through cross-bar $m^2$, and terminates in a bearing in cross-bar $m^3$. Between cross-bars $m^2$ and $m^3$ shaft $b^2$ is provided with a drive-pulley, $c$, and beveled-gear wheel $e$. Near gear-wheel $e$ an upright cross-bar, $d$, is secured, through which drive-shaft $a$ passes, and on the end of which is secured a beveled-gear wheel, $f$, that is formed to gear with wheel $e$. The outer end of shaft $a$ is journaled in the upper part of bracket $a'$, and between said bracket and frame A, on shaft $a$, is secured a fly-wheel, D. Over the foot-treadles $h$ and $h'$ a seat, $g$, is formed, on which the operator sits while operating the same. Drum B is formed open at the top, the bottom or lower surface being closed in. Two flexible springs, $r$ and $r'$, are secured by their inner ends to sliding block $k$, one at each end, the outer ends of the same being connected to the frame A.

In place of drum B, I construct a wheel with cross-arms, having a pocket, $g^2$, in which a weight is placed, as shown in Fig. 2.

The operation of my device is as follows: The operator, placing one foot on treadle $h$, presses the same down, drawing the sliding block forward, thereby pulling the shafts $b$ and $b'$ out of a vertical position and tilting the drum B or wheel, whereby the weight at the highest point in the periphery of said wheel aids in turning the same and aids in turning shaft $a$, and thereby transferring power to machinery or vehicles attached, with but little aid from the operator placing his foot on the treadles.

Having thus described my invention, what I desire to secure by Letters Patent is—

1. A mechanical power consisting of a frame having a flexible shaft loosely journaled within said frame, said shaft being connected by beveled gear or pulleys to a drive-shaft, said flexible shaft having a drum, wheel, or arms with weight secured to the same, said shaft being operated by a sliding block, connecting-rods, and foot-treadles, substantially as shown and specified.

2. In a mechanical power, a vertical flexible shaft having a weighted wheel, drum, or arms, a slotted sliding block surrounding said shaft, and means for operating the same, substantially as shown and specified.

3. The combination of the frame A, shafts $b\ b'\ b^2$, drum B, and arms, with the sliding blocks $k$ and $n$, links $i$ and $i'$, and foot-treadles $h$ and $h'$, substantially as shown and specified.

In testimony whereof I affix my signature in presence of two witnesses.

BENJAMIN R. TRULL.

Witnesses:
H. J. ENGLAND,
F. M. GREEN.